(12) United States Patent
Fogarty et al.

(10) Patent No.: US 8,749,230 B1
(45) Date of Patent: Jun. 10, 2014

(54) METHOD AND SYSTEM FOR MEASURING THE THICKNESS OF AN OBJECT

(75) Inventors: Michael D. Fogarty, Auburn, WA (US);
William J. Tapia, Kapowsin, WA (US);
Gary E. Georgeson, Tacoma, WA (US);
Martin L. Freet, Federal Way, WA
(US); Jeffrey G. Thompson, Kent, WA
(US); David W. Anderson, Kent, WA
(US); Ronald E. VonWahlde, Puyallup,
WA (US)

(73) Assignee: The Boeing Company, Chicago, IL (US)

( * ) Notice: Subject to any disclaimer, the term of this patent is extended or adjusted under 35 U.S.C. 154(b) by 526 days.

(21) Appl. No.: 12/903,351

(22) Filed: Oct. 13, 2010

(51) Int. Cl.
*G01B 7/06* (2006.01)

(52) U.S. Cl.
USPC .......................................................... 324/229

(58) Field of Classification Search
USPC .......................................................... 324/229
See application file for complete search history.

(56) References Cited

U.S. PATENT DOCUMENTS

| 4,096,438 | A |   | 6/1978  | Humphrey |
| 4,336,498 | A |   | 6/1982  | Lukhvich et al. |
| 4,791,367 | A |   | 12/1988 | Typpo |
| 5,539,675 | A | * | 7/1996  | Carroll, Sr. et al. ........... 702/170 |
| 5,865,059 | A |   | 2/1999  | Alessandro |
| 6,586,930 | B1 | * | 7/2003 | Kumar et al. ................. 324/225 |
| 6,843,135 | B2 | * | 1/2005 | Douglas et al. ................. 73/799 |
| 7,313,959 | B2 |   | 1/2008 | Georgeson et al. |
| 7,448,271 | B2 | * | 11/2008 | Duncan et al. .................. 73/634 |

* cited by examiner

*Primary Examiner* — Reena Aurora
(74) *Attorney, Agent, or Firm* — Armstrong Teasdale LLP

(57) ABSTRACT

Methods and systems are provided for measuring a thickness of an object. A first portion of a device is positioned on a first side of the object, and a second portion of the device is positioned on an opposite side of the object. The first portion includes at least one first mount and at least one eddy current sensor coupled to the first mount. The second portion includes at least one second mount and at least one target coupled to the second mount. The first mount is magnetically coupled to the second mount such that the eddy current sensor is oriented to interact with the target to enable the thickness of the object to be measured.

13 Claims, 4 Drawing Sheets

METHOD AND SYSTEM FOR MEASURING THE THICKNESS OF AN OBJECT

BACKGROUND

The present disclosure relates generally to measurement systems and, more particularly, to methods and systems for use in measuring a thickness of a structure when only limited access is available on a side of the structure being measured.

It is common during a manufacturing process to inspect objects to determine whether the object meets desired design and/or product specifications. For example, a wall of a structure being manufactured may be measured for its thickness. However, depending on the physical constraints of the structure and/or the tool conducting the measurement, accurately measuring the thickness of the wall may be difficult and/or time consuming. For example, there may be limited access to one side of the wall. Moreover, the wall may have varying thicknesses and/or other anomalies.

BRIEF DESCRIPTION

In one aspect, a method is provided for measuring a thickness of an object. The method includes positioning a first portion of a device on a first side of the object and positioning a second portion of the device on an opposite side of the object. The first portion includes at least one first mount and at least one eddy current sensor coupled to the first mount. The second portion includes at least one second mount and at least one target coupled to the second mount. The first mount is magnetically coupled to the second mount such that the eddy current sensor is oriented to interact with the target to enable the thickness of the object to be measured.

In another aspect, a device is provided for measuring a thickness of an object. The device includes a first portion and a second portion. The first portion includes at least one first mount and at least one eddy current sensor coupled to the first mount. The second portion includes at least one second mount and at least one target coupled to the second mount. The first mount is magnetically coupleable to the second mount such that the eddy current sensor is oriented to interact with the target to enable the thickness of the object to be measured.

In yet another aspect, a system is provided for measuring a thickness of an object. The system includes a device including a first portion and a second portion. The first portion includes at least one first mount and at least one eddy current sensor coupled to the first mount. The second portion includes at least one second mount and at least one target coupled to the second mount. The first mount is magnetically coupleable to the second mount such that the eddy current sensor is oriented to interact with the target to enable the thickness of the object to be measured. A robotic arm is coupled to at least one of the first portion and the second portion, and a controller is programmed to operate the robotic arm to selectively position at least one of the first portion and the second portion.

The features, functions, and advantages that have been discussed can be achieved independently in various embodiments of the present invention or may be combined in yet other embodiments further details of which can be seen with reference to the following description and drawings.

DETAILED DESCRIPTION

The subject matter described herein relates generally to measurement systems and more particularly to methods and systems for use in measuring a thickness of a structure, wherein only limited access is available on one side of the structure being measured. In one embodiment, a device is used to measure the thickness of such an object. The device includes a first portion and a second portion that are initially coupled together on opposite sides of the object. More specifically, the first portion is magnetically coupled to the second portion such that an eddy current sensor coupled to either the first portion or the second portion is oriented to interact with a target coupled to the other device portion to measure the thickness of the object. As such, the first portion is moveable along a first side of the object while the second portion is moveable along a second side of the object. Although the present disclosure is described in the context of measuring the thickness of a non-ferromagnetic object in which limited access is available for measuring the thickness, it should be understood that the subject matter described herein may be used in other contexts in which it is desirable to measure other attributes and/or other objects.

Technical effects of the methods, systems, and computer-readable media described herein may include at least one of: (a) positioning a first portion of a device on a first side of an object, (b) positioning a second portion of the device on an opposite side of the object; (c) selectively moving the eddy current sensor and/or the target between a retracted position and an extended position; (d) biasing the eddy current sensor and/or the target from the retracted position towards the extended position; (e) moving the eddy current sensor and/or the target such that at least a portion of the eddy current sensor and/or the target is substantially coplanar with a surface of a first mount and/or a second mount; (f) rotating the eddy current sensor and/or the target about an axis of rotation; and (g) magnetically coupling the first mount to the second mount such that the eddy current sensor is oriented to interact with the target to enables the thickness of the object to be measured.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
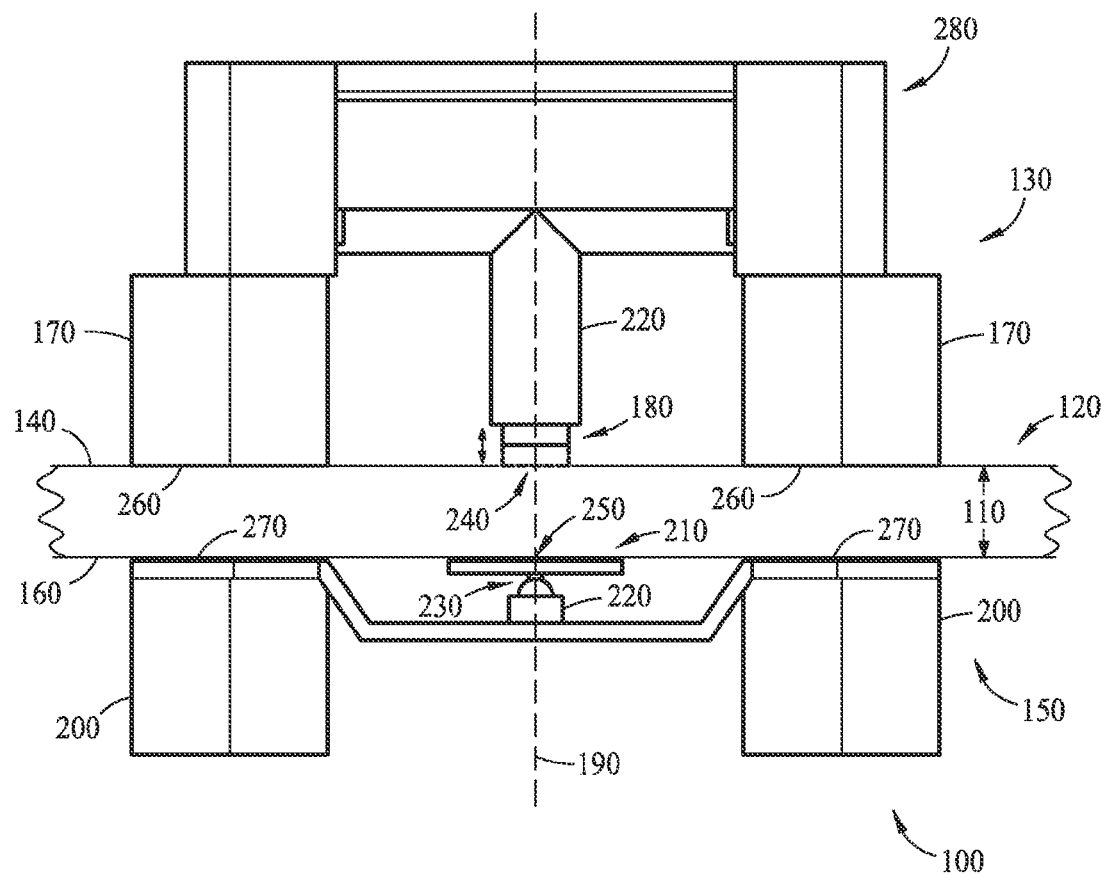
FIG. 1 is a side view of an exemplary device that may be used to measure a thickness of an object.
Figure 2:
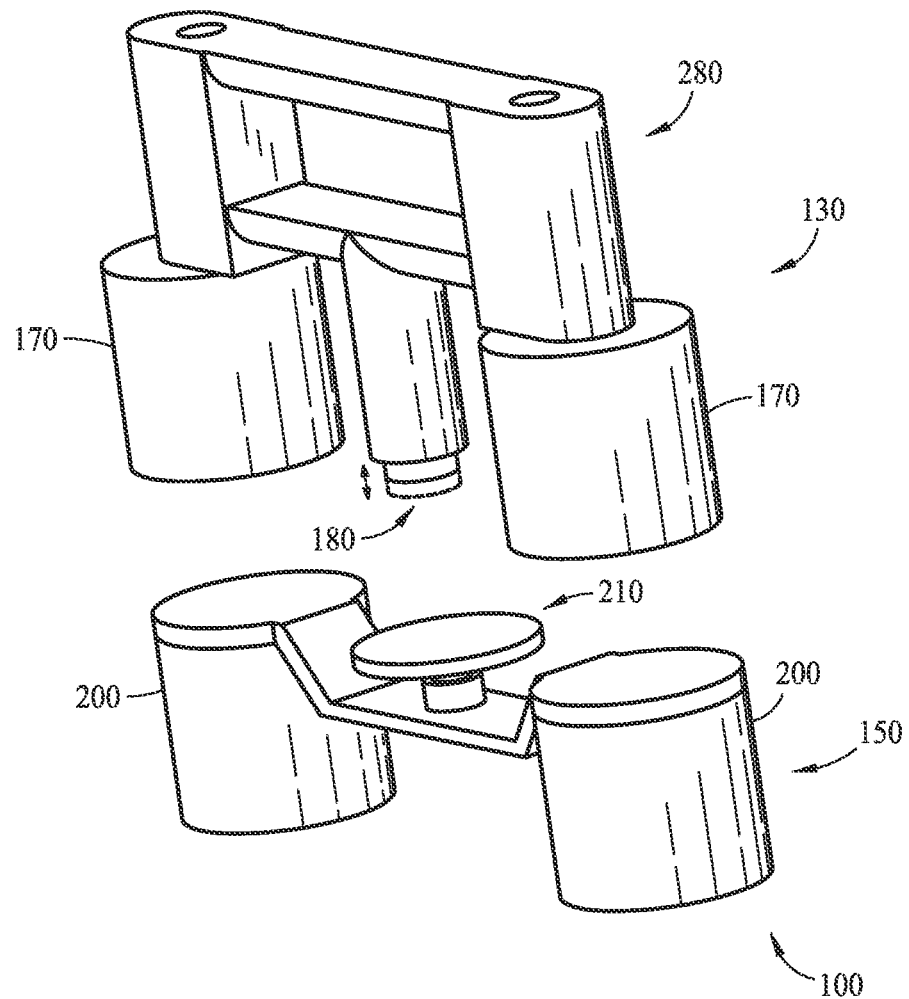
FIG. 2 is a perspective view of the device shown in FIG. 1.

FIGS. 1 and 2 illustrate an exemplary device 100 that may be used to measure a physical attribute, such as a thickness 110, of an object 120. In the exemplary embodiment, device 100 includes a first portion 130 that is positioned along a first side 140 of object 120 and a second portion 150 that is positioned along a second side 160 opposite of first side 140. In the exemplary embodiment, object 120 is a non-ferromagnetic object.

In the exemplary embodiment, first portion 130 includes at least one first magnetic mount 170 and an eddy current sensor 180 that is coupled to first magnetic mount 170. More specifically, eddy current sensor 180 is a nondestructive inspection (NDI) device that is capable of precisely measuring a position and/or a change in position of any conductive target, such as target 210, described in more detail below. Moreover, first portion 130 is configured such that a relative position of first magnetic mount 170 and eddy current sensor 180 is substantially maintained. More specifically, in the exemplary embodiment, a pair of first magnetic mounts 170 are positioned on opposite sides of eddy current sensor 180, such that first magnetic mounts 170 are approximately equidistant from eddy current sensor 180 and such that first portion 130 is substantially symmetric about a center axis 190 extending through device 100. Alternatively, first magnetic mount 170 may be a ring magnet that substantially circumscribes eddy current sensor 180.

Second portion 150 includes at least one second magnetic mount 200 and a target 210 that is coupled to second magnetic mount 200. In the exemplary embodiment, target 210 is a copper plate. Alternatively, target 210 may be fabricated from any suitable material and/or any suitable configuration, such that target 210 may function as described herein. Second portion 150 is configured such that a relative position of second magnetic mount 200 and target 210 is substantially maintained. More specifically, in the exemplary embodiment, a pair of second magnetic mounts 200 are positioned on opposite sides of target 210. In the exemplary embodiment, second magnetic mounts 200 are approximately equidistant from target 210 such that second portion 150 is substantially symmetric about center axis 190 extending through device 100. In the exemplary embodiment, as first magnetic mounts 170 are magnetically coupled to second magnetic mounts 200, eddy current sensor 180 is positioned in a desired orientation that enables sensor 180 to interact with target 210 to measure thickness 110. Alternatively, second magnetic mount 200 may be a ring magnet that substantially circumscribes target 210.

In the exemplary embodiment, eddy current sensor 180 and/or target 210 is moveable along center axis 190 between a retracted position (not shown) and an extended position (not shown). More specifically, in the exemplary embodiment, a biasing mechanism 220 biases eddy current sensor 180 and/or target 210 towards the extended position. In one embodiment, biasing mechanism 220 is coupled to a control mechanism that selectively moves biasing mechanism 220 between the retracted position and the extended position. For example, in such an embodiment, a user may squeeze a handle to retract eddy current sensor 180 and/or target 210 and release the handle to extend eddy current sensor 180 and/or target 210. In the exemplary embodiment, biasing mechanism 220 is a coil spring. Alternatively, biasing mechanism 220 may have any suitable configuration that enables biasing mechanism 220 to function as described herein. Moreover, in the exemplary embodiment, a gimbaled mechanism 230 is coupled to eddy current sensor 180 and/or to target 210 such that eddy current sensor 180 and/or target 210 is rotatable or pivotable about its axis of rotation.

Eddy current sensor 180 and/or target 210 are moveable to enable sensor point 240 and target point 250 to be substantially coplanar with a first magnetic mount surface 260 and a second magnetic mount surface 270, respectively. More specifically, in the exemplary embodiment, point 240 and surface 260 are positioned substantially flush with first side 140 of object 120, and point 250 and surface 270 are positioned substantially flush with second side 160 of object 120 to enable device 100 to be positioned to precisely measure thickness 110 of object 120. In the exemplary embodiment, first magnetic mount surface 260 is a bottom surface, and second magnetic mount surface 270 is a top surface. In the exemplary embodiment, surface 260 and/or surface 270 is at least partially fabricated from a material that facilitates reducing friction, wear, and/or energy consumption. For example, such a material includes, but is not limited to, Teflon® (polytetrafluoroethylene (PTFE)) (Teflon® is a registered trademark of DuPont, headquartered in Wilmington, Del.). Alternatively, surface 260 and/or surface 270 may be at least partially fabricated from any suitable material that enables device 100 to function as described herein.

In the exemplary embodiment, either first portion 130 and/or second portion 150 includes a handle 280 that enables a user to easily grasp first portion 130 and/or second portion 150. Alternatively, first portion 130 and/or second portion 150 may be coupled to a robotic arm (not shown). In such an embodiment, the robotic arm may be coupled to a controller (not shown in FIG. 2) such that the robotic arm may be operated to selectively position first portion 130 and/or second portion 150.

During operation of device 100, in the exemplary embodiment, magnetic mounts 170 and 200 position eddy current sensor 180 relative to target 210 to enable thickness 110 of object 120 to be measured. More specifically, the relative positioning of eddy current sensor 180 and target 210 enables thickness 110 to be determined in limited access regions of object 120, such as along second side 160. In the exemplary embodiment, biasing mechanism 220 and/or gimbaled mechanism 230 enable maintaining contact between eddy current sensor 180 and first side 140 or target 210 and second side 160. More specifically, in the exemplary embodiment, biasing mechanism 220 facilitates maintaining contact between eddy current sensor 180 and first side 140 and/or target 210 and second side 160. Moreover, in the exemplary embodiment, gimbaled mechanism 230 facilitates orienting eddy current sensor 180 and/or target 210 to enable accurately measuring thickness 110 when object 120 varies in thickness over a width of device 100.

In the exemplary embodiment, eddy current sensor 180 produces an alternating current (not shown) that generates an alternating magnetic field (not shown) adjacent to point 240. The alternating magnetic field induces eddy currents that create an opposing magnetic field (not shown) adjacent to target 210. The opposing magnetic field resists the magnetic field produced by eddy current sensor 180. The interaction of the magnetic field, i.e., the strength of the interaction, is dependent on a distance defined between eddy current sensor 180 and target 210. More specifically, eddy current sensor 180 detects changes in the interaction of the magnetic fields and produces a voltage output that is proportional to the change in the interaction sensed between the fields. More specifically, the voltage output is representative of a change in the distance between eddy current sensor 180 and target 210. Thus, the voltage output is indicative of thickness 110 of object 120.

Figure 3:
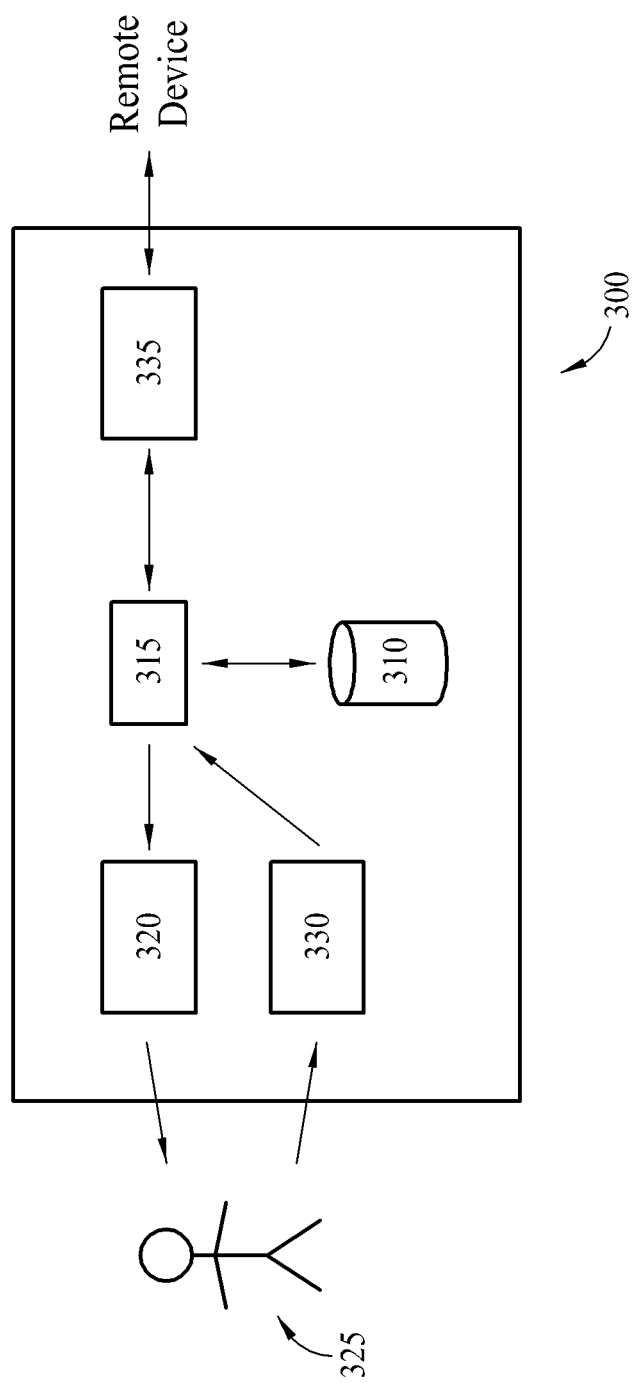
FIG. 3 is block diagram of an exemplary controller that may be used with the device shown in FIG. 1.

FIG. 3 is a block diagram of an exemplary controller 300 that may be used with device 100 (shown in FIG. 1). More specifically, in the exemplary embodiment, controller 300 may be used to control the operation of the robotic arm to selectively position first portion 130 and/or second portion 150. In the exemplary embodiment, controller 300 includes a memory device 310 and a processor 315 that is coupled to memory device 310 for use in executing programmed instructions. Processor 315 may include one or more processing units (e.g., in a multi-core configuration). In one embodiment, executable instructions and/or structural health data are stored in memory device 310. For example, in the exemplary embodiment, memory device 310 may store software for use in selectively positioning first portion 130 and/or second portion 150 relative to object 120 and/or for use in interpreting the voltage output of eddy current sensor 180 to determine thickness 110 of object 120. Controller 300 is programmable to perform one or more operations described herein by programming memory device 310 and/or processor 315. For example, processor 315 may be programmed by encoding an operation as one or more executable instructions and providing the executable instructions in memory device 310.

Processor 315 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Memory device 310, as described herein, is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, executable instructions, structural health data, and/or any other type of data suitable for use with the methods and systems described herein.

In the exemplary embodiment, controller 300 includes a presentation interface 320 that is coupled to processor 315. Presentation interface 320 outputs (e.g., display, print, and/or otherwise output) information, such as, but not limited to, configuration data, structural health data and/or any other type of data to a user 325. For example, presentation interface 320 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 320 includes more than one display device. In addition, or in the alternative, presentation interface 320 may include a printer.

In the exemplary embodiment, controller 300 includes an input interface 330 that receives input from user 325. For example, input interface 330 may receive an operating command and/or any other type of data suitable for use with the methods and systems described herein. In the exemplary embodiment, input interface 330 is coupled to processor 315 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 320 and as input interface 330.

In the exemplary embodiment, controller 300 includes a communication interface 335 that is coupled to memory device 310 and/or processor 315. Communication interface 335 is coupled in communication with a remote device, such as eddy current sensor 180, the robotic arm, and/or another controller 300. For example, communication interface 335 may include, without limitation, a wired network adapter, a wireless network adapter, and/or a mobile telecommunications adapter.

Figure 4:
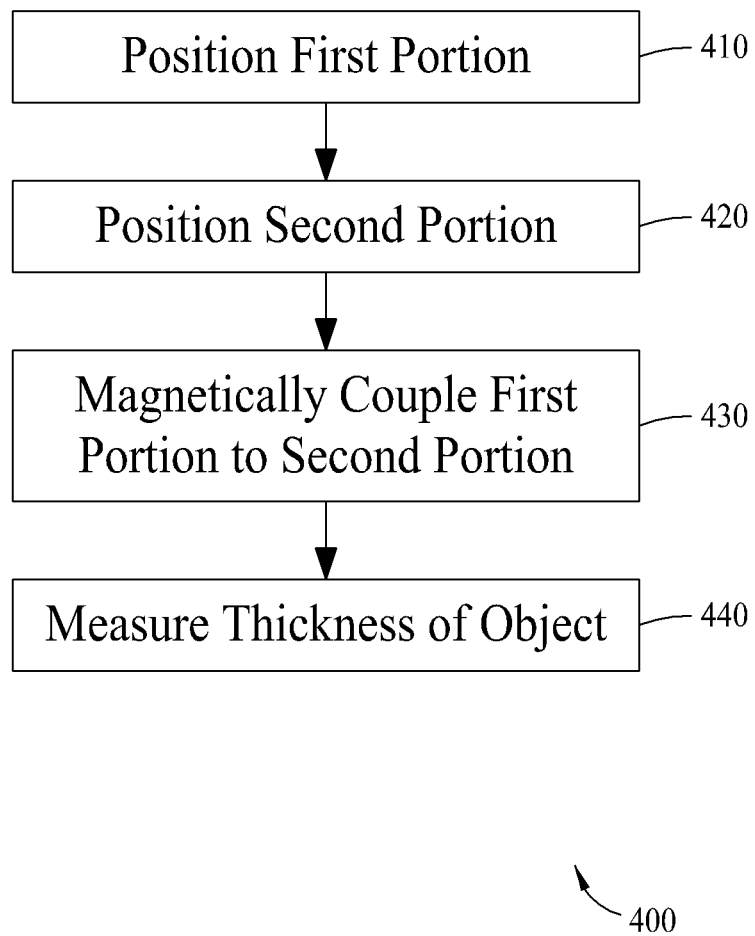
FIG. 4 is a flow chart illustrating an exemplary method for measuring a thickness of an object using the device shown in FIG. 1.

FIG. 4 is a flow chart illustrating an exemplary method 400 for measuring thickness 110 of object 120. In the exemplary embodiment, controller 300 is programmed to direct the robotic arm to position 410 first portion 130 on first side 140 of object 120 and position 420 second portion 150 on second side 160 of object 120. In one embodiment, shims may be positioned between object 120 and first portion 130 and/or second portion 150 for use as a calibration standard. In such an embodiment, the shims have a suitable thickness and are fabricated from a material that is similar to the material used to fabricate object 120. In the exemplary embodiment, first magnetic mount 170 is magnetically coupled 430 to second magnetic mount 200 such that eddy current sensor 180 is oriented to interact with target 210. Once first portion 130 and second portion 150 are suitably positioned and eddy current sensor 180 and target 210 are suitably oriented, in the exemplary embodiment, device 100 is configured to measure 440 thickness 110 of object 120.

The above-described systems and methods facilitate measuring a thickness of an object. More specifically, the embodiments described herein enable measuring the thickness of an object that has limited access on one side of the object. The embodiments described herein facilitate inspecting limited access structures. Accordingly, the embodiments described herein enable increasing a quality of an inspection and/or decreasing an amount of time required to perform the inspection.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for measuring a thickness of an object, said method comprising:
positioning a first portion of a device on a first side of the object, wherein the first portion includes at least one first mount and at least one eddy current sensor coupled to the first mount;
positioning a second portion of the device on an opposite side of the object, wherein the second portion includes at least one second mount and at least one target coupled to the second mount;
magnetically coupling the first mount to the second mount such that the eddy current sensor is oriented to interact with the target to enable the thickness of the object to be measured; and
selectively moving at least one of the eddy current sensor and the target between a retracted position and an extended position, wherein the at least one of the eddy current sensor and the target is biased towards the extended position.

2. A method in accordance with claim 1 wherein selectively moving at least one of the eddy current sensor and the target further comprises moving at least one of the eddy current sensor and the target such that at least a portion of at least one of the eddy current sensor and the target is substantially coplanar with a surface of at least one of the first mount and the second mount.

3. A method in accordance with claim 1 further comprising positioning a pair of the first mounts on opposite sides of the eddy current sensor, and a pair of the second mounts on opposite sides of the target.

4. A method in accordance with claim 1 wherein selectively moving at least one of the eddy current sensor and the target further comprises rotating at least one of the eddy current sensor and the target about an axis of rotation.

5. A device for measuring a thickness of an object, said device comprising:
   a first portion comprising at least one first mount and at least one eddy current sensor coupled to said first mount; and
   a second portion comprising at least one second mount and at least one target coupled to said second mount, wherein said first mount is magnetically coupleable to said second mount such that said eddy current sensor is oriented to interact with said target to enable the thickness of the object to be measured, and wherein at least one of said eddy current sensor and said target is selectively moveable between a retracted position and an extended position, wherein at least one of said first portion and said second portion further comprises a biasing mechanism configured to bias said at least one of said eddy current sensor and said target towards the extended position.

6. A device in accordance with claim 5, wherein at least one of said eddy current sensor and said target is moveable such that at least a portion of at least one of said eddy current sensor and said target is substantially coplanar with a surface of at least one of said first mount and said second mount.

7. A device in accordance with claim 5, wherein a pair of said first mounts are positioned on opposite sides of said eddy current sensor, and a pair of said second mounts are positioned on opposite sides of said target.

8. A device in accordance with claim 5, wherein at least one of said eddy current sensor and said target is coupled to a gimbaled mechanism, such that at least one of said eddy current sensor and said target is rotatable about an axis of rotation.

9. A system for measuring a thickness of an object, said system comprising:
   a device comprising a first portion and a second portion, said first portion comprising at least one first mount and at least one eddy current sensor coupled to said first mount, said second portion comprising at least one second mount and at least one target coupled to said second mount, said first mount magnetically coupleable to said second mount such that said eddy current sensor is oriented to interact with said target to enable the thickness of the object to be measured, wherein at least one of said eddy current sensor and said target is selectively moveable between a retracted position and an extended position, wherein at least one of said first portion and said second portion further comprises a biasing mechanism configured to bias said at least one of said eddy current sensor and said target towards the extended position;
   a robotic arm coupled to at least one of said first portion and said second portion; and
   a controller programmed to operate said robotic arm to selectively position at least one of said first portion and said second portion.

10. A system in accordance with claim 9, wherein at least one of said eddy current sensor and said target is moveable such that at least a portion of at least one of said eddy current sensor and said target is substantially coplanar with a surface of at least one of said first mount and said second mount.

11. A system in accordance with claim 9, wherein a pair of said first mounts are positioned on opposite sides of said eddy current sensor, and a pair of said second mounts are positioned on opposite sides of said target.

12. A system in accordance with claim 9, wherein at least one of said eddy current sensor and said target is coupled to a gimbaled mechanism, such that at least one of said eddy current sensor and said target is rotatable about an axis of rotation.

13. A method for measuring a thickness of an object, said method comprising:
   positioning a first portion of a device on a first side of the object, wherein the first portion includes at least one first mount and at least one eddy current sensor coupled to the first mount;
   positioning a second portion of the device on an opposite side of the object, wherein the second portion includes at least one second mount and at least one target coupled to the second mount;
   magnetically coupling the first mount to the second mount such that the eddy current sensor is oriented to interact with the target to enable the thickness of the object to be measured; and
   selectively moving at least one of the eddy current sensor and the target between a retracted position and an extended position such that at least a portion of the at least one of the eddy current sensor and the target is substantially coplanar with a surface of at least one of the first mount and the second mount.

* * * * *